(12) United States Patent
Törrönen et al.

(10) Patent No.: US 7,564,848 B2
(45) Date of Patent: Jul. 21, 2009

(54) METHOD FOR THE ESTABLISHING OF CONNECTIONS IN A COMMUNICATION SYSTEM

(75) Inventors: Juha Törrönen, Jarvenpää (FI); Tuomo Turunen, Helsinki (FI)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 11/150,149

(22) Filed: Jun. 13, 2005

(65) Prior Publication Data
US 2006/0239263 A1 Oct. 26, 2006

(30) Foreign Application Priority Data
Apr. 21, 2005 (FI) .................. 20050412

(51) Int. Cl.
*H04L 12/28* (2006.01)
(52) U.S. Cl. ...................... 370/392; 370/401
(58) Field of Classification Search .......... None
See application file for complete search history.

(56) References Cited

U.S. PATENT DOCUMENTS

| | | | |
|---|---|---|---|
| 6,266,707 B1 * | 7/2001 | Boden et al. ........... | 709/245 |
| 6,606,315 B1 | 8/2003 | Albert et al. | |
| 7,039,641 B2 * | 5/2006 | Woo ..................... | 707/100 |
| 2002/0184376 A1 | 12/2002 | Sternagle | |
| 2004/0062254 A1 * | 4/2004 | Kuzhiyil et al. ........ | 370/401 |
| 2004/0109459 A1 * | 6/2004 | Madour et al. ......... | 370/401 |
| 2005/0165917 A1 * | 7/2005 | Le et al. ................ | 709/220 |
| 2005/0276247 A1 * | 12/2005 | Heiman et al. ......... | 370/331 |
| 2006/0149811 A1 * | 7/2006 | Bennett et al. ......... | 709/203 |
| 2007/0025301 A1 * | 2/2007 | Petersson et al. ...... | 370/338 |

FOREIGN PATENT DOCUMENTS

| | | |
|---|---|---|
| EP | 1 528 745 A1 | 5/2005 |
| WO | WO 03/019973 A2 | 3/2003 |
| WO | WO 2004/105341 A1 | 12/2004 |

OTHER PUBLICATIONS

3GPP TS 23.228 IP Multimedia Subsystem (Dec. 2004) V5.13.0.*

* cited by examiner

*Primary Examiner*—Wing F Chan
*Assistant Examiner*—Eunsook Choi
(74) *Attorney, Agent, or Firm*—Squire, Sanders & Dempsey L.L.P.

(57) ABSTRACT

The invention relates to the multiplexing of transport layer connections in a communication system comprising a front-end node and a number of server nodes. A first packet from the server node is routed to the front-end node, the first packet comprising destination information associated with an external node. A termination point associated with the destination information is established in the front-end node. The application data from the first packet is provided to an application entity in the front-end node. The first packet is sent to the external node.

24 Claims, 4 Drawing Sheets

METHOD FOR THE ESTABLISHING OF CONNECTIONS IN A COMMUNICATION SYSTEM

BACKGROUND OF THE INVENTION

1. Field of the Invention

The invention relates to the providing of server clusters in a communication system. Particularly, the invention relates to a method for the establishing of connections in a communication system.

2. Description of the Related Art

In the supporting of high-traffic Internet sites it is in practice impossible to provide the site using a single physical node. Therefore, the concept of server clusters has been developed. Other Internet nodes see server clusters as if they consisted merely of a single node. Other nodes access the server cluster using a single IP address. However, service request packets destined to the single IP address are first routed to a dispatcher node, from which the service requests are assigned to one of a number of clustered server nodes. Each service request may be assigned separately from other service requests. An example of such a service is a WWW site comprising a number of pages provided under a single domain name. In the case of server clusters, the domain name may be resolved to a single IP address. However, with the introduction of IP multimedia such a service could also be an IP multimedia session processing server. Analogously to a WWW site, the IP multimedia session processing server is identified using a domain name, which should also be resolved to a single IP address.

In the case of WWW sites supporting merely the downloading of content, it is possible to treat the Hypertext Transfer Protocol (HTTP) request separately from the response that is provided by the server node in response to the service request. There is no requirement to provide application layer processing for the service requests and responses. The most important factor is that there is only a single request associated with the downloading transaction. There is no need to be able to correlate subsequent request messages with earlier request messages.

In the case of IP multimedia the situation is somewhat different. The involvement of application layer is required in order to be able to perform load balancing correctly between the server nodes in the cluster. After the receiving of a Session Initiation Protocol (SIP) Invite request from an external node and the assigning of a server node for the Invite request, the dispatcher node must be able to associate subsequent SIP messages pertaining to the Invite request and route them to the assigned server node. Therefore, an application layer load balancer must terminate Transmission Control Protocol (TCP) connections and process all session related signaling messages. The SIP is described in detail in Internet Engineering Task Force (IETF) document RFC 3261.

Reference is now made to FIG. 1, which illustrates the Transmission Control Protocol (TCP) segment headers in prior art. The TCP is described in detail in IETF document RFC 793. TCP does the tasks of a transport layer in the Open System Interconnection (OSI) model of data communications. In FIG. 1 there is a TCP segment header 100. In header 100 the source port identifies the application that sent the TCP segment and the destination port the targeted application. A single application may use several ports for the sending of data and it may listen to several ports for data received. By means of the port number a protocol stack knows the correct application entity to which the TCP segment must be sent. The sequence number identifies in bytes the current position in the byte stream that is being sent. The acknowledgement number indicates to the sender the bytes in the byte stream that have correctly been received by the receiver. During the establishment of a TCP connection, initial sequence numbers (ISNs) are exchanged between the sending and the receiving host. The Len-field indicates in 32-bit words the length of the TCP header. The flags comprise an urgent flag, an acknowledgement flag (ACK), a push flag, a connection reset flag, a synchronize sequence numbers (SYN) flag and a final flag (FIN). The flag SYN is used in connection establishment phase. A segment with SYN flag is referred to as a SYN segment or a TCP-SYN segment. Similarly, a segment with the ACK flag on is referred to as an ACK segment. Window size is the number of data bytes beginning with the one indicated in the acknowledgment field, which the sender of the current segment is willing to accept. The checksum is computed as the 16-bit one's complement of the one's complement sum of a pseudo header comprising information collected from the IP header, the TCP header, and the data, padded as needed with zero bytes at the end to make a multiple of two bytes. The explanation for the rest of the TCP header field not discussed herein may be found, for example, the document RFC 793.

TCP connections comprise three phases: a connection establishment phase, a data transfer phase and a connection termination phase. A three-way handshake is used to establish a connection. A four-way handshake is used to tear down a connection. Despite the fact that it is possible for a pair of hosts to initiate a connection between each other simultaneously, typically one host opens a socket and listens passively for a connection from the other end. This is commonly referred to as a passive open, and it designates the server-side of a connection. The client-side of a connection to be established initiates an active open by sending an initial SYN segment to the server as part of the three-way handshake. The server-side responds to a valid SYN segment with a SYN segment with also the ACK flag on. Finally, the client-side responds to the server with an ACK segment, thereby completing the three-way handshake and the connection establishment phase.

Reference is now made to FIG. 2, which is a block diagram illustrating a cluster server comprising a TCP connection router in prior art. The TCP connection router handles only incoming TCP connections to a cluster server. In the case of FIG. 2 there is no requirement to provide application layer processing for the service requests and responses. The service requests and responses are typically Hypertext Transfer Protocol (HTTP) requests and responses. A solution similar to the one illustrated in FIG. 2 is described in publication "NetDispatcher: A TCP Connection Router", G. Goldszmidt, G. Hunt, IBM Research Division, T.J. Watson Research Center, Yorktown Heights, N.Y., 1997.

In FIG. 2, there is illustrated a server cluster. The server cluster comprises a TCP connection router 200 and the TCP connection router is connected, for example, by means of a local area network 205, to server nodes 201-204. TCP connection router 200 has knowledge of the state of each server in the cluster. It performs load balancing. TCP router 200 is connected to an IP network 210. IP network 210 may be, for example, the Internet or a corporate intranet. Connected to IP network 210 are also two client nodes, namely a client node 212 and a client node 214. In FIG. 2, there are illustrated two request and response transactions. The transactions are, for example, retrievals of HTML pages from a WWW-site, which is provided by the serves cluster.

First, client 212 sends an HTTP request to the server cluster. The HTTP request is first processed in TCP connection router 200. TCP connection router 200 determines which of the server nodes is least congested, in other words, has the lowest processing load at the moment. TCP connection router may also perform random allocation of server nodes or based on a hash value that is computed from at least one field carried in the request message header.

In the case of client 212, TCP connection router determines that the HTTP request must be sent to server 202 as is illustrated with arrow 250. The response from server 202 back to client 212 does not traverse TCP connection router 200. The response is routed via IP network 210 to client 212 as is illustrated with arrow 252. When client B 214 send an HTTP request to server cluster, it is first processed by TCP connection router 200, which determines that the HTTP request should be sent to server 204. The HTTP request route is illustrated in FIG. 2 with arrow 260. The HTTP response back from server 204 towards client 214 is not routed via TCP router 200, but instead it bypasses TCP connection router 200 and is routed via IP network 210 to client 214, as is illustrated with arrow 262. In all HTTP request targeted to servers in the cluster, the destination address always refers to TCP connection router 200. Thus, in routing of incoming packet IP network 210 always routes the packet to TCP connection router 200.

The problem in prior art solutions is that they are not applicable to the cases where an application layer entity must correlate a number of interrelated application protocol requests and responses, and thus terminate on the one hand the connections to the external nodes and on the other hand the connections to the server nodes in the cluster. Further, the solutions in prior art fail to teach the handling of cases where the multiplexing of signaling traffic between two nodes to a single transport layer connection is required.

SUMMARY OF THE INVENTION

The invention relates to a method for the establishing of connections to an external node in a communication system comprising at least a front-end node and at least one server node, said server nodes configured to communicate with said front-end node and said front-end node configured to communicate with said external node, the method comprises: delivering a first packet from said server node to said front-end node, said first packet comprising destination information associated with an external node; and establishing a termination point associated with said destination information in said front-end node.

The invention relates also to a system for the establishing of connections to an external node comprising: at least one server node configured to send a first packet, said first packet comprising destination information associated with said external node; a front-end node configured to receive said first packet from said server node and to establish a termination point associated with said destination information.

The invention relates also to a network node for the establishing of connections to an external node comprising: a protocol stack entity configured to receive a first packet from a server node, said first packet comprising destination information associated with said external node; and an application entity configured to establish a termination point associated with said destination information.

The invention relates also to a computer program comprising code adapted to perform the following steps when executed on a data-processing system: receiving a first packet originating from said server node to said front-end node, said first packet comprising destination information associated with an external node; and establishing a termination point associated with said destination information.

In one embodiment of the invention, the at least one server node are comprised in a server cluster. The server cluster may be implemented, for example, as a blade server. The front-end node may be part of the server cluster.

In one embodiment of the invention, by the establishing of a termination point is meant, for example, the forming of a logical association between the protocol stack entity and an application entity. A logical association within a given node is identified in the destination information referring to that node. In other words, the destination information referring to a given node also comprises an identifier for a logical association between the protocol stack entity within the node and an application entity. By the establishing of a termination point may also be meant that a pre-existing logical association is enabled for communication between the protocol stack entity and an application entity. In one embodiment of the invention the termination point is a socket and by the establishing of the termination point is meant the opening of the socket.

In one embodiment of the invention, the term destination information comprises the address of a node such as the external node. In one embodiment of the invention, the term destination information comprises the address of a node, such as the external node, and a field for the determining of an application entity. The field may be, for example, a port number referring to an application entity within the node. The application entity within the node may have registered itself as the user of the port identified using the port number. The port may be, for example, a Transmission Control Protocol (TCP) port. In one embodiment of the invention, the term destination information merely comprises a field for the determining of an application entity within a node such as a port number.

In one embodiment of the invention, application data from the first packet is provided to an application entity within said front-end node via said termination point. The front-end node performs the multiplexing of connections to said external node. The multiplexing is performed for packets received from the at least one server nodes to the front-end node. The multiplexing comprises, for example, that the application entity opens a connection to the external node, if no connection is available to the external node. Thereupon, a message is transmitted from said application entity to said external node.

In one embodiment of the invention, the first packet is provided by a protocol stack entity to an application entity within the front-end node. The application entity opens a transport layer connection to the external node, if no transport layer connection is available to the external node. Thereupon, the application entity transmits an application protocol message comprising information from the first packet to the external node via the transport layer connection.

In one embodiment of the invention, the termination point is a socket. In one embodiment of the invention, the term socket generally refers to an association between a protocol stack entity and an application entity. At a receiving end a socket is opened by an application entity to indicate to the protocol stack entity that packets received with a specific port number or application identifier field must be provided to that application entity. In one embodiment of the invention, the socket is a Transmission Control Protocol (TCP)/Internet Protocol (IP) socket.

In one embodiment of the invention, the method further comprises: creating in the front-end node a first filter specifying at least the address of the server node; selecting in the front-end node the first packet based on the first filter; creating in the front-end node a second filter specifying the destination information; and selecting in the front-end node the first packet based on the second filter.

In one embodiment of the invention, the network node further comprises: the protocol stack entity configured to provide the first packet to an application entity via a termination point; and the application entity configured to transmit a message to the external node.

In one embodiment of the invention, the network node further comprises: a management entity configured to create a first filter specifying at least the address of the server node, and to create a second filter specifying destination information associated with an external node; the protocol stack entity configured to provide the first packet to a policy entity; and a policy entity configured to select the first packet based on the first filter and to select the first packet based on the second filter.

In one embodiment of the invention, a second packet originating from the server node is routed to the front-end node by an internal network connecting the front-end node to the at least one server node. The second packet comprises destination information referring to the external node. The second packet is selected in the front-end node based on the second filter. In other words, the second packet is intercepted by the policy entity, which has obtained the second packet from the protocol stack entity as soon as it has been received to the front-end node. The second packet is provided from the policy entity to the application entity via the protocol stack entity. Considering that the second packet is obtained back to the protocol stack entity from the policy entity as the result of a filter rule, the protocol stack entity considers the second packet as a packet originally addressed to the front-end node. The protocol stack entity identifies the socket opened by the application entity based on destination information comprised in the second packet. The protocol stack entity provides the second packet to the application entity via the socket. The application entity transmits an application protocol message comprising information from the second packet via the transport layer connection to the external node. The application protocol message may also comprise information from the first packet. The application protocol message may also comprise information from at least one packet sent between the first packet and the second packet. The application entity may have been waiting for a complete application protocol message from the server node via the socket before it performs application layer processing for the received information and sends the application protocol message to the external node. In one embodiment of the invention, the protocol stack entity comprises at least the TCP and IP protocols.

In one embodiment of the invention, as a server node in the server cluster enters active state, it informs its address and, optionally, port numbers pertaining to at least one application layer entity to the front-end node. By an active state is meant a state in which a server node is ready to process application layer request messages or other traffic in which the server node participates in load sharing. The opposite is a passive state in which a server node is, for example, in a testing mode or inactive due to software or hardware upgrade. A server node enters active state, for example, automatically after reboot process or due to operator action.

The application layer entities are such that they are relevant for the front-end node processing. For example, they are subjected to the load balancing processing performed by the front-end.

In one embodiment of the invention, the first packet comprises a Transmission Control Protocol segment, in which the bit for synchronization has the value 1. In other words, it is a SYN TCP segment.

In one embodiment of the invention, the front-end node is a load balancer node, which determines a server node in the server node cluster to which an incoming service request must be assigned. The load balancing may be based on, for example, load and status information received from the server nodes in the cluster or random or pseudorandom allocation performed by the front-end node.

In one embodiment of the invention, the server node comprises a Session Initiation Protocol (SIP) server and the application entity is a Session Initiation Protocol (SIP) entity. In one embodiment of the invention, the front-end node comprises a Session Initiation Protocol (SIP) proxy or server.

In one embodiment of the invention, the communication system comprises at least one of a Global System of Mobile Communications (GSM) network and a Universal Mobile Telephone System (UMTS) network.

In one embodiment of the invention, the server nodes form an IP Multimedia Subsystem (IMS) Call State Control Function (CSCF).

In one embodiment of the invention, the computer program is stored on a computer readable medium. The computer readable medium may be a removable memory card, magnetic disk, optical disk or magnetic tape.

The benefits of the invention are related to the enabling of load balancing that is performed on application layer in the cases where the application layer is required to associated several request messages that are associated with a single application layer session.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
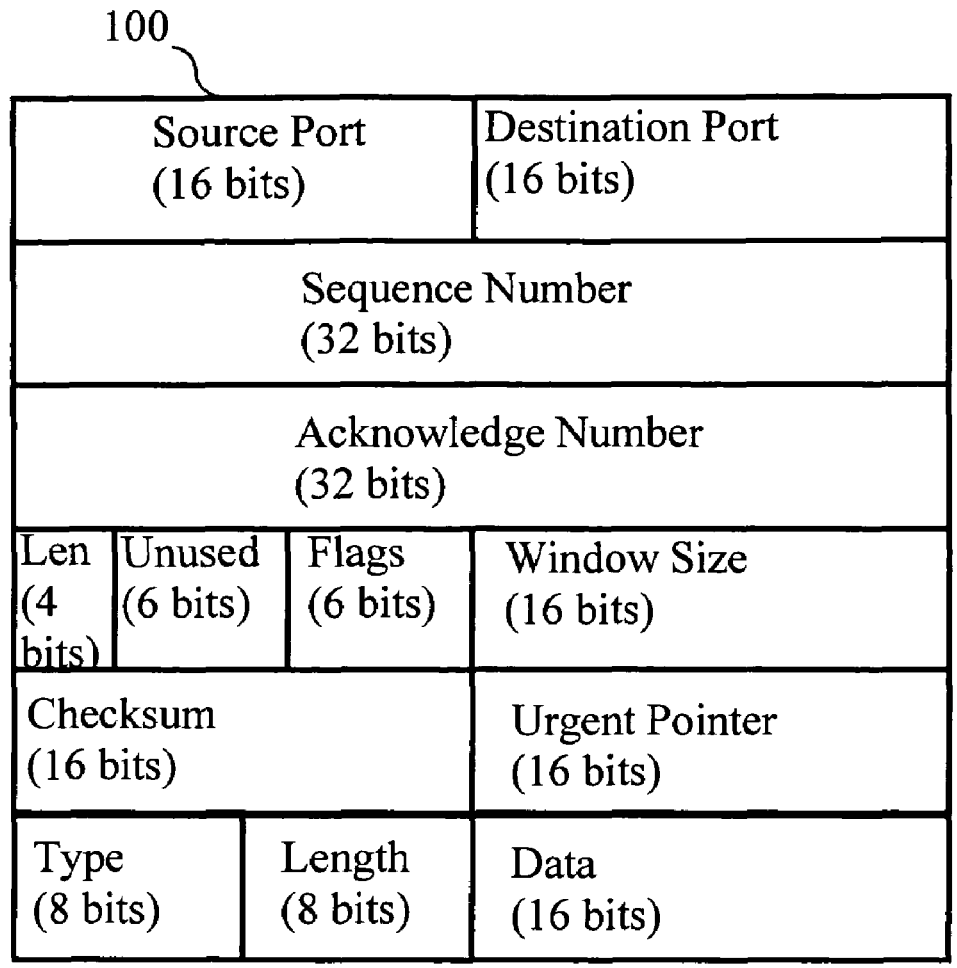
FIG. 1 illustrates the Transmission Control Protocol (TCP) segment headers in prior art.
Figure 2:
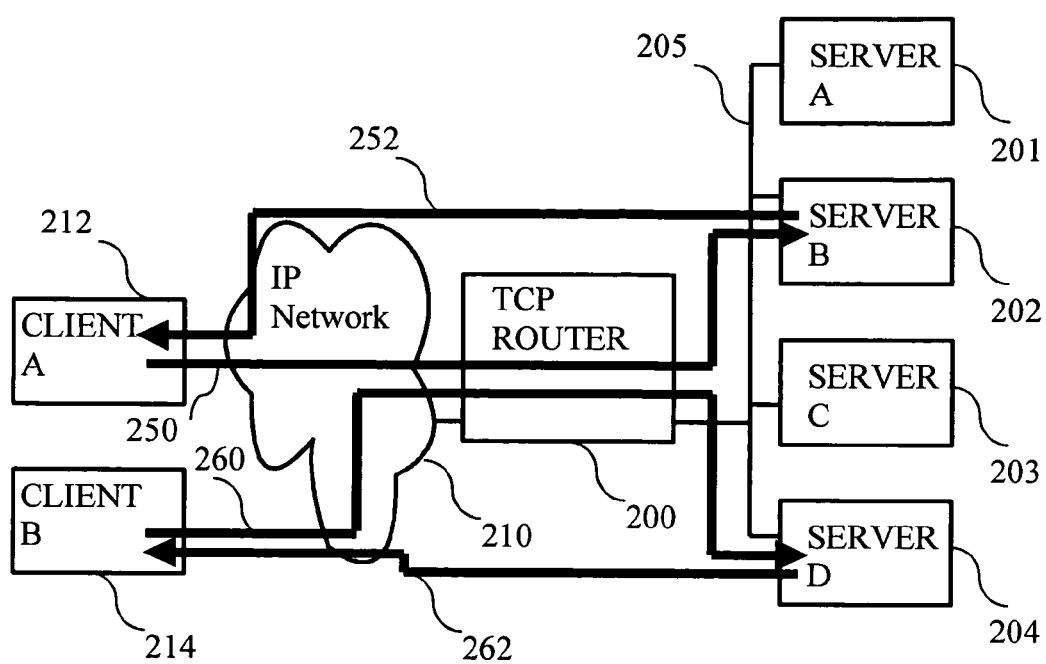
FIG. 2 is a block diagram illustrating a cluster server comprising a TCP connection router in prior art.
Figure 3:
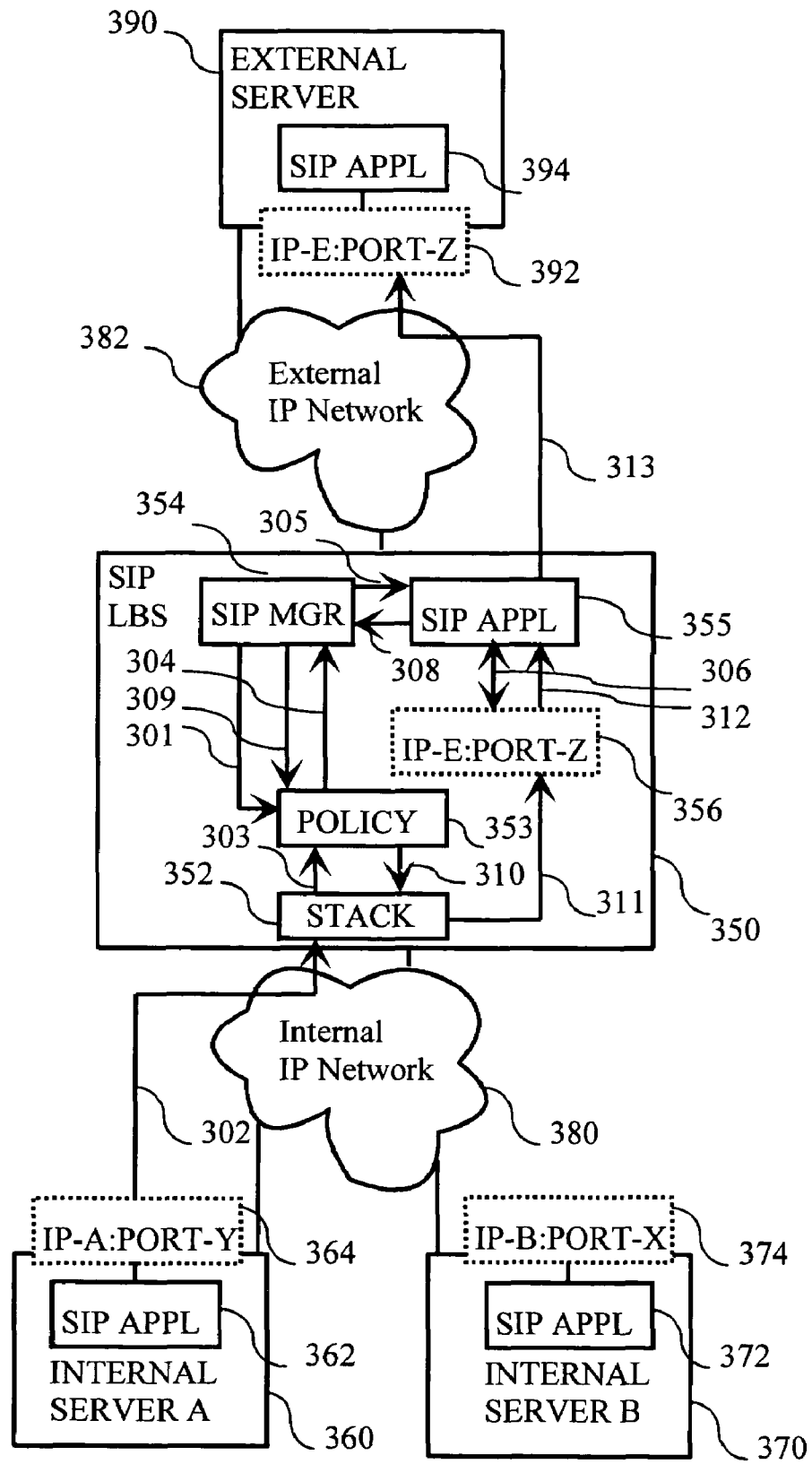
FIG. 3 is a block diagram illustrating a cluster server comprising a load balancer node in one embodiment of the invention.

FIG. 3 is a block diagram illustrating a cluster server comprising a load balancer node in one embodiment of the invention.

In FIG. 3, there is illustrated a server cluster. The server cluster comprises a load balancer node 350, an internal IP network 380 and two internal servers, namely internal server 360 and internal server 370. Internal IP network 380 may be implemented, for example, using Ethernet. In internal serves 360 and 370, there are SIP applications 362 and 372, respectively. Both internal servers have TCP/IP and UDP/IP protocol stacks (not shown). SIP application 362 has a socket 364 open. As illustrated, the IP address associated with socket 364 is IP-A and the port number is Y. SIP application 372 has a socket 374, in which the IP address is IP-B and the port number is X. SIP load balancer node 350 comprises a TCP/IP protocol stack 352. Associated with the TCP/IP protocol stack 352 is a policy entity 353. Policy entity 353 performs the filtering of IP packets and it has associated with it a number of policy rules, which tell what IP packets to catch and where this IP packet must be provided in SIP load balancer node 350. There is also a SIP application entity 355 and a SIP management entity 354. SIP load balancer node 350 is connected to an external IP network 382, which may be, for example, the Internet or a corporate intranet. Connected to external IP network 382 is an external server 390. Within external server 390, there is a SIP application entity 394. SIP application entity 394 listens to a socket 392. In the socket 392 the IP address is IP-E and the port number is Z.

In FIG. 3 processing begins so that for internal server 360 there arises a need to send a SIP message to external server 390. The SIP message is routed towards external server 390 via SIP load balancer node 350. However, there arises the problem that SIP load balancer node 350 does not have knowledge of the IP address of external server 390 and the port number that it should be listening to. Therefore, a filter rule must be configured for policy entity 353. The rule data itself is stored in the memory of SIP load balancer node 350. SIP management entity 354 adds a filter rule to policy entity 353, which specifies that all TCP packets with source address IP-A and port number Y must be passed to SIP management entity 354. In one embodiment of the invention, the filter rule may also specify an extension entity (not shown) in association with policy entity 353, which takes care of the actual notification of SIP management entity 354. The adding of filter rule is illustrated with arrow 301. Some time later internal server 360 sends a packet to IP address IP-E and port number Z. Internal IP network 380 routes the packet to SIP load balancer node 350. The routing decision may already be performed in internal server 360. The packet is illustrated with arrow 302. The packet is processed in TCP/IP protocol stack 352, from which it is passed to policy entity 353, as illustrated with arrow 303.

Based on the earlier defined filter rule, policy entity 353 notices that in the IP packet the destination IP address is IP-E and the TCP port number is Z, which entails that SIP management entity 354 must be notified of the packet. Policy entity 353 notifies SIP management entity 354 of the incoming packet as illustrated with arrow 304. SIP management entity 354 sends a request to SIP application entity 355 to open a listening socket with IP address IP-E and port number Z, as illustrated with arrow 305. SIP application 355 opens the listening socket as illustrated with line 306. As the socket has been opened SIP application 355 acknowledges the opening to SIP management entity 354 as illustrated with arrow 308. Thereupon, SIP management entity 354 sends a request to policy entity 353 to add a filter rule, which specifies that all TCP packets with destination address IP-E and destination port Z must be passed to the local stack. SIP management entity 354 also informs policy entity 353 to re-inject the packet back to the TCP/IP protocol stack 352. As illustrated with arrow 310, policy entity 353 re-injects the packet to TCP/IP protocol stack 352. TCP/IP protocol stack 352 when processing the packet now determines that within SIP load balancer node 350, there is open a listening socket, which should receive the packet. This is due to the destination IP address IP-E and port number Z. TCP/IP protocol stack 352 passes the packet via socket 356 to SIP application 355, as is illustrated with arrows 311 and 312.

SIP application 355 obtains data relating to a SIP message from the packet. The SIP message may be contained in the packet in its entirety or the SIP message may continue in at least one subsequent packet originating from internal server 360. If further packets are required to extract the SIP message, SIP application 355 waits for subsequent packets via socket 356 until the whole SIP message has been received to it. SIP application entity 355 determines whether there already exists an open TCP connection towards external server 390. If no connection already exists, it is opened by SIP application 355. Finally, the packet is sent to external server 390 and therein to SIP application 349 via port 392, as illustrated via arrow 313. Subsequent packets pertaining to the TCP/IP connection between SIP load balancer node 350 and server node 360 are first processed in the TCP/IP protocol stack 352, from which they are routed to policy entity 353, which determines by the filter rule created earlier that the packet must be re-injected to TCP/IP protocol stack processing locally. In TCP/IP protocol stack 352, a re-injected packet is treated as if it were a packet targeted to SIP load balancer node 350 originally, so there is no danger that such a packet is routed elsewhere. TCP/IP protocol stack 352 provides the packet to SIP application 355 via socket 356 as was done in the case of the initial packet.

Figure 4:
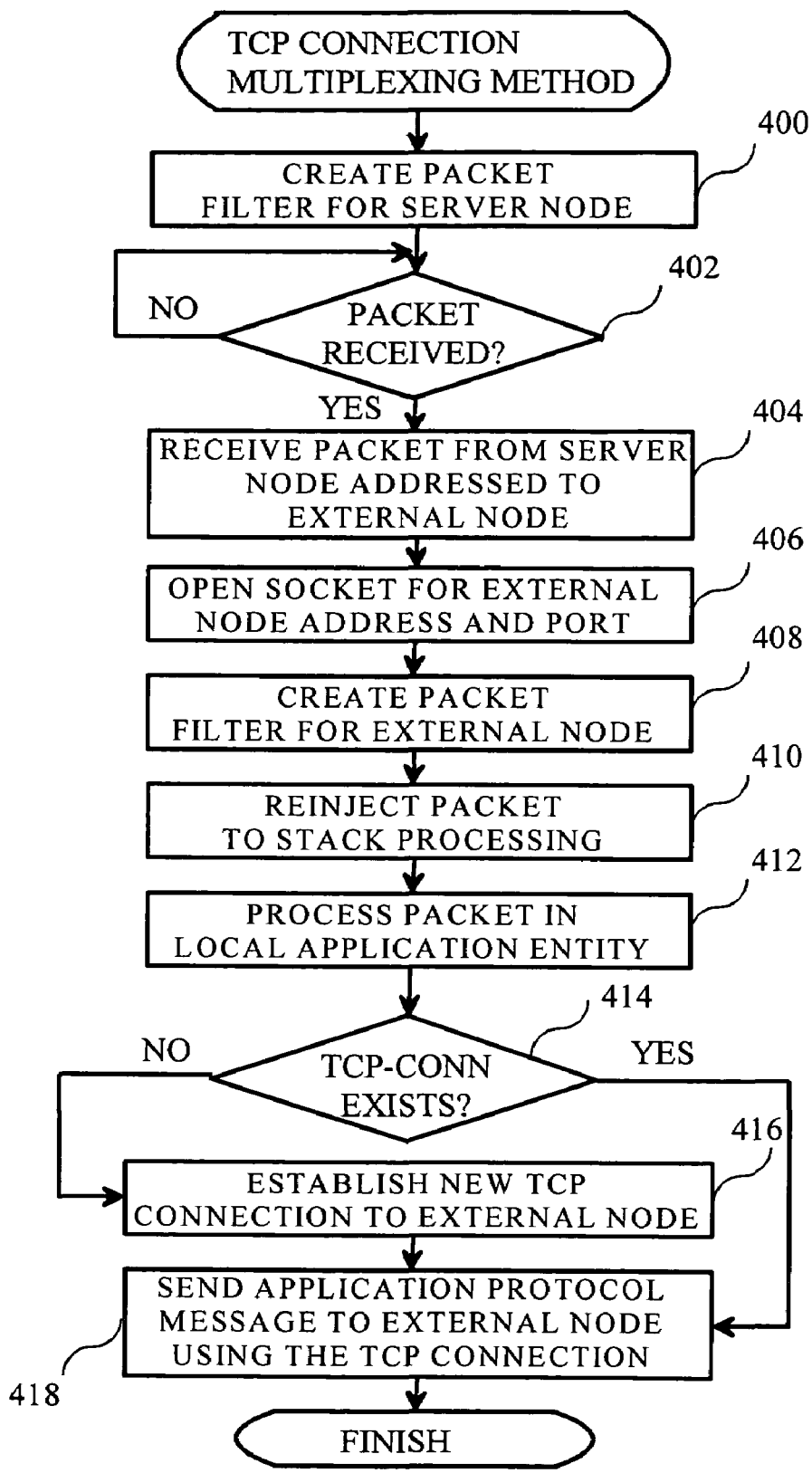
FIG. 4 is a flow chart illustrating a method for TCP connection multiplexing in one embodiment of the invention.

FIG. 4 is a flow chart illustrating a method for TCP connection multiplexing in one embodiment of the invention.

At step 400 a packet filter is created for a server node. The packet filter is created, for example, when a server node is added to the server cluster or an existing server node that has been in passive state, enters active state. The server node may inform SIP load balancer node concerning the sockets open in it that are used to send packets towards external nodes. At step 402 SIP load balancer node waits for a packet from the server node. If a packet is not received the method continues in step 402. As soon as a packet is received, method continues at step 404.

At step 404 SIP load balancer node receives the packet in its TCP/IP protocol stack and determines that the packet is addressed to the external node.

At step 406 SIP load balancer node opens a socket for the address and port of the external node. The IP address and port number are determined by inspecting the destination IP address and TCP port number from the incoming packet that was received from the server node.

At step 408 SIP load balancer node creates a packet filter for the external node. In the packet filter information is specified that packets targeted towards the IP address and the port number specified in the incoming packet must be re-injected to the protocol stack and as if the packet were addressed to SIP load balancer node originally by the sender.

At step 410 the current packet is re-injected to processing in the local TCP/IP protocol stack.

At step 412 the current packet is processed by local TCP/IP protocol stack and from there it is provided to local application entity via the socket that was opened at step 406. Local application entity obtains data relating to an application protocol message from the packet. The application protocol message may be contained in the packet in its entirety or it may continue in at least one subsequent packet originating from the server node. If further packets are required to extract the application protocol message, local application entity waits for subsequent packets via socket the until the whole application protocol message has been received to it.

At step 414 SIP load balancer node determines whether a TCP connection exists towards the external node. If the TCP connection does not exist at step 416, a new TCP connection is established to the external node.

If the TCP connection exists at step 418 the application protocol message is forwarded to the external node using the existing TCP connection. The application protocol message is passed to the TCP/IP protocol stack. The application protocol message is sent in one packet or in a number of separate packets depending on the maximum transmission unit size.

Communication between SIP application 355, SIP management entity 354, policy entity 353 and TCP/IP protocol stack 352 is performed in an internal format. The software components, that is, the entities illustrated in FIG. 3 may be implemented in various ways. They may be implemented as processes executed under the native operating system. The software entities may be implemented as separate processes or so that a number of different software entities is implemented by means of one process. Some software entities may be implemented as modules linked to another entity.

In one embodiment of the invention, the operating system is the Linux™ operating system. In one embodiment of the invention, the communication between the policy entity and the SIP management entity 354 is implemented as a loadable kernel module, which attaches to the protocol stack entity using networking hook. The kernel module communicates with the user space SIP management entity 354 by using the Netlink socket interface. The SIP management entity 354 sets rules to the kernel module, which defines the source IP address and port. As a TCP SYN packet matches the rule, the kernel module signals the SIP management entity 354 to open a new listening socket according to the received TCP SYN packet and then the SIP management entity 354 replies to the kernel module, which in turn re-injects the original TCP SYN packet to the IP stack. The re-injected packed will end up to the listening socket just created. In one embodiment of the invention, TCP/IP protocol stack entity 352 and the filtering functions of policy entity 353 are comprised in an operating system kernel. The communication functions of policy entity 353 towards other entities may be implemented as a loadable kernel module. In one embodiment of the invention the SIP management entity 354 and the SIP application 355 may be implemented as a single application entity, for example, as a single process or thread.

It is obvious to a person skilled in the art, that with the advancement of technology, the basic idea of the invention may be implemented in various ways. The invention and its embodiments are thus not limited to the examples described above; instead they may vary within the scope of the claims.

What is claimed is:

1. A method, comprising:
   receiving, in a first network node, a message indicative of an active state of a server node;
   creating, in said first network node, a first filter specifying at least an address of said server node;
   receiving, from said server node, a first packet in said first network node, said first packet comprising destination information associated with a second network node;
   selecting, in said first network node, said first packet based on said first filter;
   requesting that an application entity, in said first network node, open a listening termination point in said first network node based on a termination point information in said first packet;
   creating, in said first network node, a second filter specifying said destination information, said second filter triggering an identifying of said listening termination point using termination point information in a triggered packet;
   selecting said first packet based on said second filter; and
   providing said first packet to said listening termination point.

2. The method according to claim 1, wherein said destination information comprises an address and a port number.

3. The method according to claim 1, wherein said termination point comprises a socket.

4. The method according to claim 1, the method further comprising:
   multiplexing connections to said second network node in said first network node;
   providing application data from said first packet to said application entity within said first network node via said listening termination point; and
   transmitting a message from said application entity to said second network node.

5. The method according to claim 4, the method further comprising:
   routing a second packet originating from said server node to said first network node, said second packet comprising said destination information associated with said second network node;
   selecting in said first network node said second packet based on said second filter;
   providing application data from said second packet to said application entity via said listening termination point; and
   transmitting said message from said application entity to said second network node.

6. The method according to claim 1, wherein said first packet comprises a transmission control protocol segment, in which a bit for synchronization has a value of 1.

7. The method according to claim 1, wherein said first network node comprises a load balancer node.

8. The method according to claim 1, wherein said server node comprises a session initiation protocol server and said application entity comprises a session initiation protocol entity.

9. A system, comprising:
   at least one server node configured to send a first packet, said first packet comprising destination information associated with a second node; and
   a first network node configured to
      receive a message indicative of an active state of a first server node among said at least one server node,
      create a first filter specifying at least an address of said first server node,
      receive, from said first server node, said first packet, said first packet comprising destination information associated with said second network node,
      select said first packet based on said first filter,
      request that an application entity open a listening termination point in said first network node based on a termination point information in said first packet,
      create a second filter specifying said destination information, said second filter triggering an identifying of said listening termination point using termination point information in a triggered packet,
      select said first packet based on said second filter, and
      provide said first packet to said listening termination point.

10. The system according to claim 9, wherein said destination information comprises an address and a port number.

11. The system according to claim 9, wherein said listening termination point comprises a socket.

12. The system according to claim 9, said first network node is configured to
   multiplex connections to said second network node, provide application data from said first packet to said application entity within said first network node via said listening termination point, and transmit a message from said application entity to said second network node.

13. The system according to claim 9, wherein said first network node is configured to receive a second packet originating from said first server node, said second packet comprising said destination information, select said second packet based on said second filter, provide application data from said second packet to said application entity via said listening termination point, and to transmit said message from said application entity to said second network node.

14. The system according to claim 9, wherein said first packet comprises a transmission control protocol segment, in which a bit for synchronization has a value of 1.

15. The system according to claim 9, wherein said first network node comprises a load balancer node.

16. The system according to claim 9, wherein said first server node comprises a session initiation protocol server and said application entity comprises a session initiation protocol entity.

17. A computer program embodied on a computer-readable medium, the computer program comprising code for controlling a processor to execute operations comprising:

receiving, in a first network node, a message indicative of an active state of a server node;

creating, in said first network node, a first filter specifying at least an address of said server node;

receiving, from said server node, a first packet in said first network node, said first packet comprising destination information associated with a second network node;

selecting, in said first network node, said first packet based on said first filter;

requesting that an application entity, in said first network nodes, open a listening termination point based on a termination point information in said first packet;

creating a second filter specifying said destination information, said second filter triggering an identifying of said listening termination point using termination point information in a triggered packet;

selecting said first packet based on said second filter; and providing said first packet to said listening termination point.

18. The computer program according to claim 17, wherein said computer readable medium comprises a removable memory card.

19. The computer program according to claim 17, wherein said computer readable medium comprises a magnetic or an optical disk.

20. An apparatus comprising:

a receiver configured to receive a message indicative of an active state of a server node, and receive, from said server node, a first packet, said first packet comprising destination information associated with a second network node; and a processor configured to provide said first packet to a listening termination point, create, a first filter specifying at least an address of said server node, select said first packet based on said first filter, request that an application entity open said listening termination point based on a termination point information in said first packet, create a second filter specifying said destination information, said second filter triggering a matching of termination point information in a triggered packet to said listening termination point, and select said first packet based on said second filter.

21. The apparatus according to claim 20, wherein said destination information comprises an address and a port number.

22. The apparatus according to claim 20, wherein said termination point is a socket.

23. The apparatus according to claim 20, wherein the processor is further configured to multiplex connections to said second node in said apparatus, provide application data from said first packet to said application entity within said apparatus via said listening termination point, and transmit a message from said application entity to said second network node.

24. The apparatus according to claim 23, wherein the processor is further configured to route a second packet originating from said server node to said first network node, said second packet comprising said destination information associated with said second network node, select, in said apparatus, said second packet based on said second filter, provide application data from said second packet to said application entity via said listening termination point, and transmit said message from said application entity to said second network node.

* * * * *